United States Patent [19]

Wilmes

[11] 4,008,862

[45] Feb. 22, 1977

[54] BALE UNROLLING DEVICE

[76] Inventor: Raymond G. Wilmes, Rte. 2, Maryville, Mo. 64468

[22] Filed: Apr. 28, 1976

[21] Appl. No.: 681,278

[52] U.S. Cl. .................. 242/86.5 R; 214/147 G
[51] Int. Cl.² ................................. B65H 75/46
[58] Field of Search ............ 242/96, 86, 5 R, 54 R; 214/147 G, 1 QB, 653; 56/343

[56] References Cited

UNITED STATES PATENTS

| 2,954,886 | 10/1960 | Nelson | 214/147 GX |
|---|---|---|---|
| 3,587,218 | 6/1971 | Geary | 56/343 |
| 3,908,846 | 9/1975 | Brummitt | 242/86.5 R |

Primary Examiner—Edward J. McCarthy
Attorney, Agent, or Firm—Lowe, Kokjer, Kircher, Wharton & Bowman

[57] ABSTRACT

A portable device which assists in the unrolling of large cylindrical hay bales on the ground. A pair of arms are pivoted between rigid straps which extend from the opposite ends of a cross bar. Rotatable spikes for penetrating opposite ends of the bale are mounted on the arms. Locking pins secure the arms in rigid perpendicular extension from the cross bar with the spikes embedded in the opposite ends of the bale. A flexible chain couples the cross bar with a towing vehicle which is driven forwardly to unroll the bale. The arms are foldable after removal of the locking pins to lie generally parallel to the cross bar for carrying and storage of the device.

10 Claims, 3 Drawing Figures

BALE UNROLLING DEVICE

BACKGROUND AND SUMMARY OF THE INVENTION

This invention relates in general to the handling of large hay bales and more specifically to an improved device that is used to unroll bales on the ground.

The recent trend among farmers and ranchers toward the use of large cylindrical hay bales has been accompanied by attendant difficulties in handling of the hay. In particular, unrolling of the cylindrical bales on the ground in order to feed animals cannot practically be accomplished manually or with conventional hay handling equipment due to the large size and heavy weight of the bales. Specialized equipment has been developed to handle the large bales; however, such equipment has not been altogether satisfactory for use in bale unrolling. This type of equipment is constructed primarily to transport large bales, and it is therefore complex, expensive, difficult and time consuming to operate, and generally unsuited to unroll bales.

For the most part, existing implements that are adapted to unroll large bales are heavy units which are powered by hydraulic cylinders or other power elements. Because of their large size and weight, implements of this type can be moved only by tractors and other heavy duty towing vehicles. Such devices are thus not readily portable, and the extent to which they can be used is restricted accordingly. In addition, the large size of the implements presently available leads to problems as to adequate storage when not in use.

In view of these difficulties associated with existing hay handling devices, it is the primary object of the present invention to provide an improved device which is specifically constructed to unroll large cylindrical hay bales on the ground.

Another important object of the invention is to provide a hay handling device which is light in weight and readily foldable to a small size so as to be easily carried and to occupy little space when stored. Since the device of the present invention is portable for ease of carrying either manually or in a small truck or the like, it is a considerable improvement over existing units which are not portable and thus relatively combersome to move about.

An additional object of the invention is to provide a hay handling device of the character described which operates without the need for a power source and which is readily adapted for hitching to towing vehicles of various types.

A further object of the invention is to provide a hay handling device of the character described which is simple and inexpensive to construct and operate, and which requires little maintenance.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views.

Figure 1:
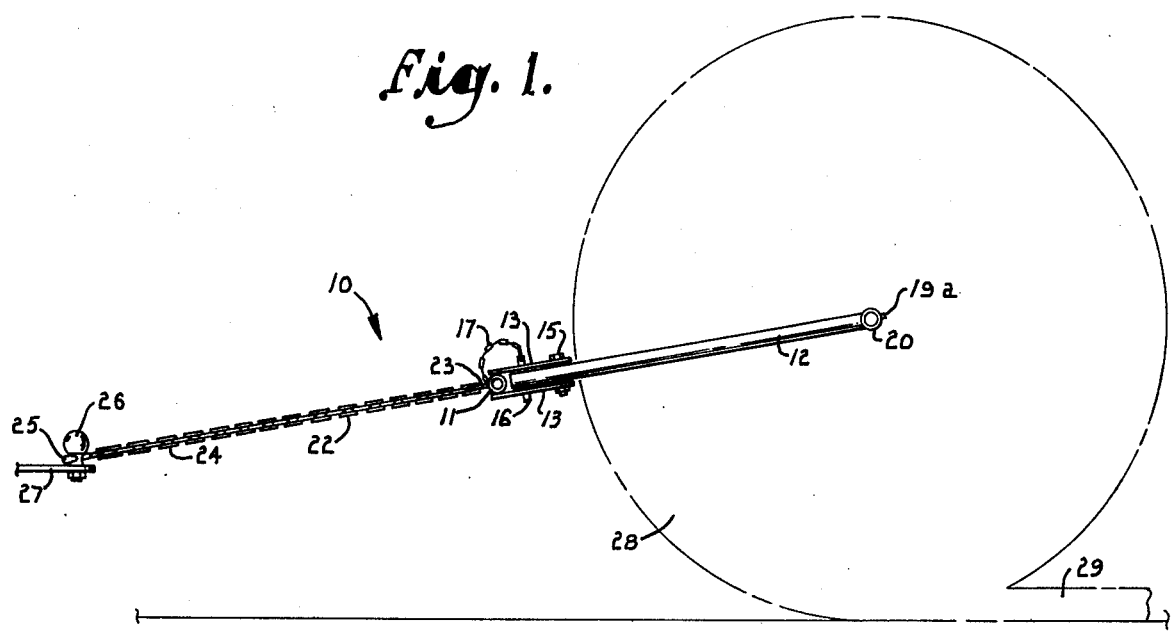
FIG. 1 is a side elevational view illustrating a hay handling device constructed in accordance with the present invention applied to a large cylindrical hay bale in position to assist in unrolling same, the bale being shown in broken lines in a partially unrolled condition.
Figure 2:
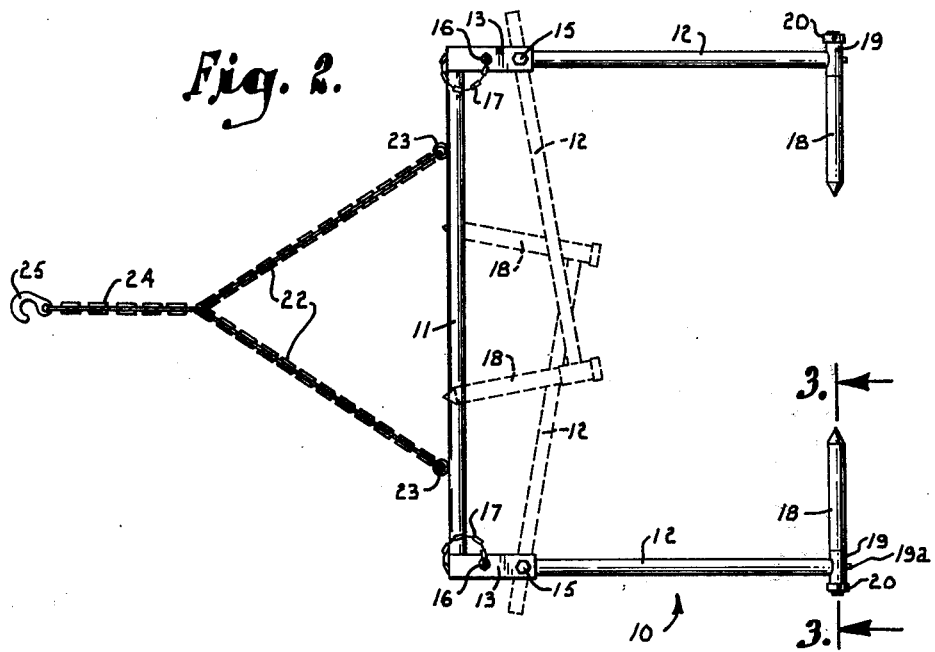
FIG. 2 is a top plan view of the device shown in FIG. 1, with the broken lines indicating movement of the arms to their folded positions.

Referring now to the drawings in greater detail, a hay unrolling device which is constructed according to the present invention is generally designated by reference numeral 10. As best illustrated in FIG. 2, the device includes a cross bar 11 and a pair of arms 12 which extend generally from the opposite ends of bar 11. Bar 11 and arms 12 are preferably tubular structural members. For the pivotal mounting of arms 12, a pair of rigid metal straps 13 are welded to each end of bar 11 to extend therefrom at a right angle. Straps 13 are thin plate like members which are each welded at one end to the top or bottom of bar 11, as best shown in FIG. 1. The straps 13 in each pair are vertically spaced from one another and are parallel to one another. The length of bar 11 is slightly greater than the length of a large cylindrical hay bale, and arms 12 are slightly longer than the maximum bale radius.

With continued reference to FIG. 1, the forward ends of arms 12 are inserted between the respective pairs of straps 13. A pivot coupling 15 in the form of a nut and bolt assembly pivotally pins each arm 12 between the corresponding pair of straps 13 at a location offset somewhat from the forward end of the arm. Couplings 15 are located at the rearward ends of straps 13 to prevent the straps from bending or spreading apart as could possibly occur if they were located elsewhere on the straps. In addition, since couplings 15 are offset considerably from the axis of cross bar 11, arms 12 are able to readily pivot about the couplings without engaging or otherwise being interfered with by cross bar 11.

Each arm 12 is bored near its forward end to receive a locking pin 16 which may also be inserted through aligned apertures that are formed through straps 13 at appropriate locations thereon. Pins 16 are retained on short chains 17 which are each secured at one end to cross bar 11. When arms 12 are oriented perpendicular to bar 11 and parallel to one another as shown in solid lines in FIG. 2, pins 16 may be inserted through the arms and straps 13 to lock the arms against pivotal movement about couplings 15. In this locked position, arms 12 extend rigidly from bar 11 in position to unroll the hay bale, as will be explained in more detail. Locking pins 16 are located more closely to bar 11 than pivot couplings 15 in order to facilitate pivoting of arms 12 without the arms engaging bar 11 at their pivoting ends, as might otherwise occur.

Figure 3:
FIG. 3 is a sectional view on an enlarged scale taken generally along line 3—3 of FIG. 2 in the direction of the arrows.

The rearward end of each arm 12 carries a spike 18. The spikes 18 are perpendicular to arms 12 and point directly toward one another when the arms are locked in the bale engaging position of FIG. 2. Each spike 18 has a pointed tip which is able to easily penetrate a hay bale and remain firmly imbedded therein. With particular reference now to FIG. 3, each spike 18 is mounted to rotate about its own axis. A cylindrical bushing 19 is welded to the end of each arm 12 at a right angle relative thereto. Spike 18 is reduced in diameter opposite its pointed end, and the reduced diameter portion of the spike is fit in bushing 19 for free rotation therein. A bearing cap 20 is secured to the end of spike 18 by a set screw 21. Caps 20 and the shoulders formed at the reduced diameter portions of spikes 18 cooperate to prevent the spikes from sliding axially in bushings 19. Each bushing 19 is provided with a grease fitting 19a.

A flexible chain is used to couple cross bar 11 with a towing vehicle (not shown) which assists in the unrolling of the bale. As best shown in FIG. 2, a pair of chain sections 22 of equal length are connected to eye bolts 23 which are secured to bar 11 at locations spaced equally from the center of the bar. Chains 22 converge in a V-shape and are connected at their forward ends at the apex of the V with a third chain 24 which carries a hook 25 at its forward end. Hook 25 may be hooked to a ball hitch 26 (FIG. 1) or to any other type of hitch which is carried on the draw bar 27 of a suitable towing vehicle such as a tractor or small truck (not shown). The chain arrangement provides a two point attachment with bar 11 and a single point attachment with the towing vehicle for added stability.

In use, the device 10 assists in unrolling large cylindrical hay bales such as that indicated by numeral 28 in FIG. 1. Locking pins 16 are removed so that arms 12 may be pivoted outwardly far enough for spikes 18 to clear the opposite ends of the bale. The arms are then pivoted inwardly to drive spikes 18 into the center of the bale on opposite ends thereof. Pins 16 are then inserted through arms 12 and straps 13 to rigidly lock the arms in place such that spikes 18 remain firmly engaged in the bale.

With the device thus locked in bale engaging position, the hook 25 is hitched to ball 26 or to another portion of the towing vehicle (not shown) which is then driven forwardly. This causes the outer layer 29 of the bale to unroll flatly on the ground, with spikes 18 being able to rotate as the unrolling of the bale takes place. The device 10 automatically lowers as the bale diameter decreases during unrolling, and bales of any diameter and at any stage of unrolling are thus readily accommodated.

When the bale 28 has been unrolled to the extent desired, pins 16 are removed to permit outward pivoting of arms 12 for the withdrawal of spikes 18 from the bale. After the spikes have been withdrawn so that the device is separated from the bale, arms 12 may be folded inwardly for easy carrying or storage. The arms are pivoted inwardly about couplings 15 at least to the broken line position shown in FIG. 2 and preferably beyond such position until the arms are generally parallel to bar 11. The pivot couplings 15 and straps 13 give arms 12 sufficient play to permit one spike 18 to clear the top of bar 11 and the other spike 18 to clear the bottom of the bar. When folded, arms 12 overlap one another slightly and spikes 18 overlap with cross bar 11 at least partially. The device is light enough to be easily carried manually in its folded condition and is small enough to occupy little room when stored or when carried in a truck bed or the like. The flexible chains 22 and 24 may be wrapped around the folded arms 12 to retain them in their folded positions when carried or stored.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. Apparatus for unrolling large hay bales comprising:
   a cross member;
   a pair of foldable arms;
   means coupling said arms with the cross member for pivotal movement about respective pivot axes located in proximity to the opposite ends of the cross member and offset from said cross member, said arms being pivotal about said axes between a folded position lying generally parallel to said cross member and a bale engaging position wherein the arms are substantially perpendicular to said cross member and substantially parallel to one another;
   means for locking said arms in the bale engaging position; and
   a pair of spikes projecting from the ends of the arms remote from said pivot axes, said spikes pointing generally toward one another to penetrate opposite ends of a bale when said arms are in the bale engaging position.

2. Apparatus as set forth in claim 1, wherein the means coupling said arms with the cross member comprises:
   a pair of rigid straps extending rigidly from each end of said cross member in generally perpendicular relationship thereto and in vertically spaced relationship to one another; and
   a pivot coupling for each arm, said pivot couplings connecting said arms between the respective pairs of straps for pivotal movement with respect thereto.

3. Apparatus as set forth in claim 2, wherein said pivot couplings are each offset from the axis of said cross member.

4. Apparatus as set forth in claim 3, wherein said pivot couplings are located at the ends of said straps remote from the cross member to restrain said remote ends of the straps against spreading apart.

5. Apparatus as set forth in claim 3, wherein said pivot couplings are more remote from said cross member than the means for locking said arms.

6. Apparatus as set forth in claim 2, wherein the means for locking said arms comprises a removable locking pin for each arm, said locking pins fitting through said arms and straps at locations offset from said pivot couplings to lock said arms against pivotal movement.

7. Apparatus as set forth in claim 6, wherein said pivot couplings are offset from said cross member a greater distance that said locking pins.

8. Apparatus as set forth in claim 1, including a flexible member for coupling said cross member to a vehicle for towing thereby, said flexible member being arranged to provide a two point attachment with said cross member and a single point attachment with the towing vehicle, said flexible member being adapted for wrapping around said arms to retain same in the folded position.

9. A portable hand operated device adapted for use in unrolling large hay bales, said device comprising:

a pair of spaced apart pivot arms each having opposite ends;
a support for said pivot arms;
means mounting each pivot arm near one end thereof to said support for pivotal movement between an extended bale engaging position wherein said arms are substantially parallel to one another, and a folded position wherein said arms are folded inwardly from the bale engaging position to overlap one another;

releaseable means for locking said arms in the bale engaging position; and
a spike for each pivot arm projecting from the end of the arm opposite said one end thereof, said spikes pointing toward one another to penetrate opposite ends of a bale when said arms are in the bale engaging position.

10. The device of claim 9, including braces extending between said one end of each pivot arm and said support.

* * * * *